United States Patent
Eikmeier et al.

[11] Patent Number: 5,858,495
[45] Date of Patent: Jan. 12, 1999

[54] LONG-AFTERGLOW ADHESIVE TAPE

[75] Inventors: Markus Eikmeier, Lensahn; Petra Lohmann, Heidenau; Arne Koops, Hamburg, all of Germany

[73] Assignee: Beiersdorf Aktiengesellschaft, Hamburg, Germany

[21] Appl. No.: 796,168

[22] Filed: Feb. 6, 1997

[30] Foreign Application Priority Data

Feb. 15, 1996 [DE] Germany .......... 196 05 535.0

[51] Int. Cl.$^6$ ............ G09F 13/20
[52] U.S. Cl. ............. 428/40.1; 250/458.1; 250/465.1; 250/466.1; 428/41.5; 428/41.6; 428/41.7; 428/41.8; 428/42.1; 428/42.2; 428/142; 428/213; 428/917
[58] Field of Search ............. 428/40.1, 41.5, 428/41.6, 41.7, 41.8, 42.1, 42.2, 142, 213, 917; 250/458.1, 466.1, 465.1

[56] References Cited

U.S. PATENT DOCUMENTS

| | | | |
|---|---|---|---|
| 2,333,641 | 11/1943 | Corwin | 250/467.1 |
| 4,360,557 | 11/1982 | Miller | 428/142 |
| 5,051,596 | 9/1991 | Perlman | 250/458.1 |
| 5,279,058 | 1/1994 | Kohn | 40/638 |

FOREIGN PATENT DOCUMENTS

| | | |
|---|---|---|
| 0704510 | 4/1996 | European Pat. Off. |
| 85240729 | 1/1986 | Germany |
| 9117086 | 11/1995 | Germany |
| 29515714 | 4/1996 | Germany |
| 9120070 | 12/1991 | WIPO |
| 9712646 | 4/1997 | WIPO |

*Primary Examiner*—Nasser Ahmad
*Attorney, Agent, or Firm*—Sprung Kramer Schaefer & Briscoe

[57] ABSTRACT

Long-afterglow adhesive tape consisting of a) a first layer of aliphatic polyurethane acrylate or polyester acrylate in which a long-afterglow pigment is incorporated in a proportion of from 40% by weight to 80% by weight, preferably 75% by weight, b) a second layer containing a white pigment, c) a third layer comprising an ageing-resistant self-adhesive composition or a heat-activatable adhesive film, and d) if desired, a fourth layer comprising a release material with an antiadhesive coating.

10 Claims, No Drawings

LONG-AFTERGLOW ADHESIVE TAPE

The invention relates to an adhesive tape with prolonged afterglow (slow-to-fade phosphorence) as is used for marking escape routes or emergency exits.

BACKGROUND OF THE INVENTION

For workplace safety marking in buildings and on ships, there is a wide range available of marking materials with long-afterglow surfaces. The requirements regarding these materials are described in Germany in the standards series DIN 67510, Part 1 –4. For use on ships in particular, there is an additional requirement of low surface flammability in accordance with Resolution A.653(16) of the IMO (International Maritime Organization).

The adhesive tapes currently employed have, as described in DIN 67510, the following structure: a highly transparent, smooth, printable top layer for UV protection and scratchproofing, an interlayer of softened, transparent plastic with embedded long-afterglow pigments, and a bottom layer of softened, white plastic, treated with an ageing-resistant self-adhesive composition and covered with a silicone-release paper.

These currently employed adhesive tapes meet the requirement of DIN 67510 but have two decisive disadvantages. Firstly, the very thick and tear-resistant structure makes it possible without any great problem to pull the adhesive tapes off from the substrate again after they have been applied, as a result of which the unauthorized removal of these safety systems is easy. Secondly, these adhesive tapes do not withstand the fire test of IMO Resolution A.653(16).

The object of the invention, then, is to provide a long-afterglow adhesive tape which does not have the disadvantages of the prior art, or at least not to the same extent, and whose usefulness is not restricted like that of the known products.

SUMMARY OF THE INVENTION

This object is achieved by means of an adhesive tape as characterized in more detail in the claims.

The novel long-afterglow adhesive tape has a multilayer structure.

The first layer consists of an aliphatic polyurethane acrylate or a polyester acrylate in which there is incorporated, in a proportion of from 40% by weight to 80% by weight, preferably 75% by weight, a long-afterglow pigment. The layer has a thickness of from 200 $\mu$m to 800 $\mu$m, preferably 500 $\mu$m. The long-afterglow pigment is preferably Zns:Cu Lumilux Grün N-PM from Riedel de Häen or GSS-SA from G.B.C. Ltd,.

The second layer, which has a thickness of from 30 $\mu$m to 150 $\mu$m, preferably 100 $\mu$m, is blended with a white pigment, such as titanium dioxide or calcium carbonate. This second layer can consist of an aliphatic polyurethane acrylate comprising the white pigment in a proportion of from 20% by weight to 45% by weight, preferably 40% by weight. The second layer can also consist of a primer, for example a commercially available PVDC-based coating system, which comprises the white pigment in a proportion of from 60% by weight to 80% by weight, preferably 70% by weight. Alternatively, the second layer is formed by a white, highly opaque printing ink, for example a cationically curing UV system PUR-ZK Weiß 45 from Pröll.

Applied over the second layer is a third layer consisting of an ageing-resistant self-adhesive composition, preferably of acrylate or silicone, or a heat-activatable adhesive film.

Advantageously, all three layers of the novel adhesive tape include a flameproofing agent, specifically in a proportion of from 0% by weight to 30% by weight, preferably 5% by weight. Alternatively, however, the flameproofing agent may be employed only in one or two of the three layers The flameproofing agents employed are preferably ammonium polyphosphate compounds, which are available commercially from Hoechst. Flameproofing agents of this kind offer the advantage that no halogen compounds, with their known disadvantages, are used in the novel adhesive tape.

The third layer, the ageing-resistant self-adhesive composition, can if desired be covered with a release material having an antiadhesive coating, for example a dimensionally stable release paper or a release film.

In a preferred embodiment of the novel adhesive tape, the second layer and the third layer are replaced by a single layer, namely an ageing-resistant self-adhesive composition blended with a white pigment in a proportion of from 0.05%by weight to 10% by weight, preferably from 0.8% by weight to 2% by weight.

The novel long-afterglow adhesive tape is employed preferably for the safety marking of escape routes or emergency exits, especially on ships or within buildings.

However, other applications besides these are also conceivable.

DETAILED DESCRIPTION OF THE PREFERRED EMBODIMENTS

The novel adhesive tape is notable for a large number of advantages which could not have been so foreseen even by the skilled worker.

The electron beam-cured, aliphatic polyurethane acrylate layer or polyester layer possesses a high degree of three-dimensional crosslinking. The resulting brittleness prevents unauthorized removal of the safety system; removal is possible only in small segments.

The chemical composition of the top layer gives it high light stability and UV resistance. Moreover, it also ensures good weather resistance (DIN 53387). In addition to this, the novel adhesive tape is notable for its high resistance to solvents or aggressive media such as acids or alkalis.

In addition, the aliphatic polyurethane acrylate or polyester layer offers a scratchproof surface which need not, as described in DIN 67510-4, be protected by a topcoat. (DIN 52348 "wear testing—sand flow technique")

Furthermore, the aliphatic polyurethane acrylate or polyester layer can readily be printed with commercially available printing inks by flexographic printing, screen printing or similar processes.

Finally, the advantageously thin product structure meets the fire test of IMO Resolution A.653(16). In this fire test, the flammability of a 155×180 mm vertical sample is assessed.

In the bonded state, the adhesive tape also meets the flammability test of US 302, in which it gives the result "self-extinguishing".

On the basis of the advantages set out above the novel adhesive tape is outstandingly suitable for marking escape routes or emergency exits within buildings or ships.

EXAMPLE

To prepare the top layer, the following formulation constituents are mixed with one another:

|  | % by weight |
| --- | --- |
| Polyurethane acrylate GENOMER D 900 (from Rahnchemie) | 30 |
| Luminous pigment Lumilux 50090 N-PM (from Riedel de Häen) | 60 |
| Reactive diluent DVE-3 | 10 |

The electron beam-curing coating is produced from polyurethane acrylate and reactive diluent in accordance with the above formulation. The luminous pigment is then added with intense stirring.

The composition thus prepared is spread out over a 25 μm polyester film using a laboratory coating bar. On this bar, the coating gap is set such that a coat thickness of 200 μm is obtained. The resulting coat is crosslinked using an electron beam dose of 175 kGy. On top of the top layer there is applied a further layer of a mixture of 50% by weight polyurethane acrylate, 40% by weight $TiO_2$ and 10% by weight reactive diluent. Crosslinking takes place likewise with 175 kGy.

In a further operation, 50 $g/m^2$ of a 20% by weight rosin ester adhesive resin-modified polyacrylate adhesive composition is coated from solution onto a one-sided siliconized 90 $g/m^2$ kraft paper. Following the evaporation of the solvent, the adhesive composition is crosslinked at 120° C. for 10 minutes.

To complete the adhesive tape, the silicone paper coated with adhesive composition is laminated onto the white-backed top layer such that the adhesive composition goes onto the layer pigmented with $TiO_2$. The polyester film, which is used as a process film, is peeled off again.

We claim:

1. Long-afterglow adhesive tape consisting of
   a) a crosslinked first layer consisting of aliphatic polyurethane acrylate or polyester acrylate in which a long-afterglow pigment is incorporated in a proportion of from 40% by weight to 80% by weight,
   b) a second layer containing a white pigment, said second layer being selected from the group consisting of an aliphatic polyurethane, a primer and an opaque printing ink,
   c) a third layer comprising an ageing-resistant self-adhesive composition or a heat-activatable adhesive film, and
   d) optionally, a fourth layer comprising a release material with an antiadhesive coating.

2. Long-afterglow adhesive tape according to claim 1, characterized in that the first layer has a thickness of from 200 μm to 800 μm.

3. Long-afterglow adhesive tape according to claim 1, wherein the long-afterglow pigment is ZnS:Cu.

4. Long-afterglow adhesive tape according to claim 1, wherein the second layer consists of an aliphatic polyurethane acrylate with a proportion of white pigment of from 20% by weight to 45% by weight.

5. Long-afterglow adhesive tape according to claim 1, wherein the second layer consists of a primer with a proportion of white pigment of from 60% by weight to 80% by weight.

6. Long-afterglow adhesive tape according to claim 1, wherein the second layer consists of a white printing ink.

7. Long-afterglow adhesive tape according to claim 1, wherein the second layer has a thickness of from 30 μm to 150 μm.

8. Long-afterglow adhesive tape according to claim 1, wherein one or more of the first layer, the second layer and the third layer comprise a flameproofing agent in a proportion of from 0% by weight to 30% by weight.

9. Long-afterglow adhesive tape consisting of
   a) a crosslinked first layer consisting of aliphatic polyurethane acrylate or polyester acrylate in which a long-afterglow pigment is incorporated in a proportion of from 40% by weight to 80% by weight,
   b) a single layer of an ageing resistant self-adhesive composition with a proportion of white pigment of from 0.05% by weight to 10% by weight, and
   c) optionally, a third layer comprising a release material with an antiadhesive coating.

10. A safety marking for escape routes or emergency exits comprising a long-afterglow adhesive tape according to claim 1.

* * * * *

UNITED STATES PATENT AND TRADEMARK OFFICE
CERTIFICATE OF CORRECTION

PATENT NO. : 5,858,495
DATED : January 12, 1999
INVENTOR(S) : Eikmeier, et al.

It is certified that error appears in the above-identified patent and that said Letters Patent is hereby corrected as shown below:

Col. 4, claim 2  Delete " characterized in that " and sub-
line 2           stitute -- wherein --

Signed and Sealed this

Sixteenth Day of November, 1999

Attest:

Q. TODD DICKINSON

Attesting Officer    Acting Commissioner of Patents and Trademarks